United States Patent
Lazaridis

(10) Patent No.: US 8,422,991 B2
(45) Date of Patent: *Apr. 16, 2013

(54) SYSTEM AND METHOD FOR SERVICE ACTIVATION IN MOBILE NETWORK BILLING

(75) Inventor: Mihal Lazaridis, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/350,100

(22) Filed: Jan. 13, 2012

(65) Prior Publication Data

US 2012/0115434 A1    May 10, 2012

Related U.S. Application Data

(63) Continuation of application No. 11/288,149, filed on Nov. 29, 2005, now Pat. No. 8,099,078.

(60) Provisional application No. 60/631,195, filed on Nov. 29, 2004.

(51) Int. Cl.
    *H04M 11/00*    (2006.01)

(52) U.S. Cl.
    USPC .......................................... 455/408; 455/406

(58) Field of Classification Search ........... 455/405–410
    See application file for complete search history.

(56) References Cited

U.S. PATENT DOCUMENTS

| | | | |
|---|---|---|---|
| 7,389,117 B2 * | 6/2008 | Lovell, Jr. ..................... | 455/466 |
| 2002/0168962 A1 | 11/2002 | Kurakake et al. | |
| 2002/0176377 A1 | 11/2002 | Hamilton | |
| 2002/0188562 A1 | 12/2002 | Igarashi et al. | |
| 2003/0013434 A1 | 1/2003 | Rosenberg et al. | |
| 2003/0040297 A1 | 2/2003 | Pecen et al. | |
| 2003/0060234 A1 | 3/2003 | Beyda | |
| 2003/0083041 A1 | 5/2003 | Kumar et al. | |
| 2003/0139174 A1 * | 7/2003 | Rao .............................. | 455/418 |
| 2003/0187800 A1 | 10/2003 | Moore et al. | |

(Continued)

FOREIGN PATENT DOCUMENTS

| | | |
|---|---|---|
| EP | 0779759 A2 | 6/1997 |
| EP | 1817868 B1 | 10/2010 |

(Continued)

OTHER PUBLICATIONS

International Search Report/Written Opinion for corresponding international application PCT/CA2004/002056, date of mailing May 2, 2005.

(Continued)

*Primary Examiner* — Nathan Mitchell
(74) *Attorney, Agent, or Firm* — Bereskin & Parr LLP/S.E.N.C.R.L., s.r.l

(57) ABSTRACT

Embodiments described herein provide a user with the ability to select from a list of available services that can be used on a mobile device. The services include device-based services and device-network based services. The activation, usage tracking and deactivation of a selected service can be conducted at a central location. Some of the services can be provided by different carrier network providers and in different geographical areas. The service selection can be performed from the mobile device, thus providing the user with maximum flexibility as to when and where the user requests the service.

28 Claims, 11 Drawing Sheets

U.S. PATENT DOCUMENTS

| | | |
|---|---|---|
| 2003/0233329 A1 | 12/2003 | Laraki et al. |
| 2004/0013434 A1 | 1/2004 | Hua |
| 2004/0044600 A1 | 3/2004 | Chu et al. |
| 2004/0075675 A1 | 4/2004 | Raivisto et al. |
| 2004/0180648 A1 | 9/2004 | Hymel et al. |

FOREIGN PATENT DOCUMENTS

| | | |
|---|---|---|
| JP | 2003338829 | 11/2003 |
| JP | 2004112784 | 4/2004 |
| WO | 9849848 | 11/1998 |
| WO | 0069118 | 11/2000 |
| WO | 02096026 A1 | 11/2002 |
| WO | 03039099 A2 | 5/2003 |
| WO | 03081859 A1 | 10/2003 |
| WO | 03085914 A2 | 10/2003 |
| WO | 2006056075 A1 | 6/2006 |

OTHER PUBLICATIONS

International Search Report/Written Opinion for corresponding international application PCT/CA2005/001805, date of mailing Mar. 2, 2006.

Second Written Opinion for corresponding international application PCT/CA2005/001805, date of mailing Nov. 10, 2006.

International Preliminary Report on Patentability (IPRP) for corresponding international patent application PCT/CA2005/001805 dated Mar. 19, 2007.

Extended European Search Report from EP application No. 05814390.0, dated Nov. 27, 2007.

European Examination Report dated Oct. 21, 2008, European Application No. 05814390.0.

Chinese Examination Report with English translation dated Nov. 7, 2008, Chinese Application No. 200580047454.3.

Notice of Intent to Grant dated Jun. 22, 2009, European Patent Application No. 05814390.0.

Canadian Office Action dated Feb. 22, 2010, Canadian Patent Application No. 2,589,686.

Japanese Office Action dated Apr. 15, 2010, Japanese Patent Application No. 2007-541617.

Japanese Office Action dated Mar. 18, 2011, Japanese Patent Application No. 2007-541617.

Canadian Office Action dated Feb. 24, 2011, Canadian Patent Application No. 2,589,686.

Axiotis et al., "Services in Interworking 3G and WLAN Environments", IEEE Wireless Communications, vol. 11, Issue 5, Oct. 2004, pp. 14-20.

Panagiotakis et al., "An Advanced Location Information Management Scheme for Service Provisioning in Reconfigurable Mobile Networks", IEEE Communications Magazine, vol. 41, Issue 2, Feb. 2003, pp. 88-98.

Crkvenac, "Operator's IT Road to UMTS", ConTEL 2003, Proceedings, vol. 2, Jun. 11-13, 2003, pp. 681-684.

Panagiotakis et al., "Intelligent Service Mediation for Supporting Advanced Location and Mobility-Aware Service Provisioning in Reconfigurable Mobile Networks", IEEE Wireless Communications, vol. 9, Issue 5, Oct. 2002, pp. 28-38.

Yi-Bing et al., "An All-IP Approach for UMTS Third-Generation Mobile Network", IEEE Network, vol. 16, Issue 5, Sep.-Oct. 2002, pp. 8-19.

Bos et al., "Toward an All-IP-Based UMTS System Architecture", IEEE Network, vol. 15, Issue 1, Jan.-Feb. 2001, pp. 36-45.

Clark, "Personal Communications Service in Fixed and Mobile Networks", Fourth IEEE Conference on Telecommunication, 1993, Apr. 18-21, 2003, pp. 252-256.

Chinese Notification of Completion of Grant Formalities with English translation dated Nov. 5, 2010, Chinese Application No. 200580047454.3.

Chinese Notification of Grant of Invention Patent with English translation dated Nov. 5, 2010, Chinese Application No. 200580047454.3.

European Examination Report dated Jan. 28, 2010, European Patent Application No. 05814390.0.

European Decision to Grant dated Sep. 23, 2010, European Patent Application No. 05814390.0.

Notification of Withdrawal for corresponding international application PCT1CA20041002056, date of mailing Dec. 19, 2005.

Indian First Examination Report dated Aug. 30, 2011, Indian Patent Application No. 4006/DELNP/2007.

European Certificate of Grant dated Oct. 20, 2010, European Patent Application No. 05814390.0.

European Approval of Amendments dated Jul. 21, 2010, European Patent Application No. 05814390.0.

Canadian Office Action dated Apr. 24, 2012, Canadian Patent Application No. 2,589,686.

Office Action, Canadian Application No. 2,589,686, Dated: Jan. 14, 2013.

* cited by examiner

SYSTEM AND METHOD FOR SERVICE ACTIVATION IN MOBILE NETWORK BILLING

CROSS-REFERENCE TO RELATED APPLICATIONS

This application is a continuation of U.S. patent application Ser. No. 11/288,149, filed Nov. 29, 2005 and issued to patent as U.S. Pat. No. 8,099,078, which claims the benefit of U.S. Provisional Patent Application Ser. No. 60/631,195 filed on Nov. 29, 2004. The entire contents of U.S. patent application Ser. No. 11/288,149 and U.S. Patent Application No. 60/631,195 are hereby incorporated by reference.

FIELD

Embodiments described herein relate generally to network services and wireless communication, and more specifically to enabling network services on mobile devices.

BACKGROUND

There are an increasing number of mobile devices and services for use with mobile devices that are available in the marketplace today. These new services can be classified as mobile device centric services and mobile device-external gateway paired services. Examples of mobile device centric services include wireless IP modem services, biometric scanning services, Bluetooth connectivity services, and the like. Examples of mobile device-external gateway paired services include messaging services, photo exchange services, GPS services, and the like.

In the mobile telecommunications industry, account billing and service tracking pose a significant obstacle for mobile network operators and/or network carriers. Each time a mobile user utilizes a service, the network operator would like to bill them for the service. Further, network operators prefer to lock a user into a contract for a bundled service over a longer period of time. However, it's more than likely that a mobile user would like to adopt a "just-as-needed" or "pay-per-use" approach for using services in which the users are only billed for the actual service that they use.

Unfortunately, current network operator billing systems are so complicated that these customized user requests are difficult to accommodate. In fact, most network operators cannot offer a "just-in-time" delivery of mobile device services because the network infrastructure is incapable of providing that level of flexibility. Furthermore, mobile device users are often changing the services that they subscribe to as new services become available and as their needs for services change.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment and in which:

FIG. 3 is a block diagram of an exemplary embodiment of a node of a wireless network that the mobile communication device of FIG. 1 may communicate with;

DETAILED DESCRIPTION

Figure 1:
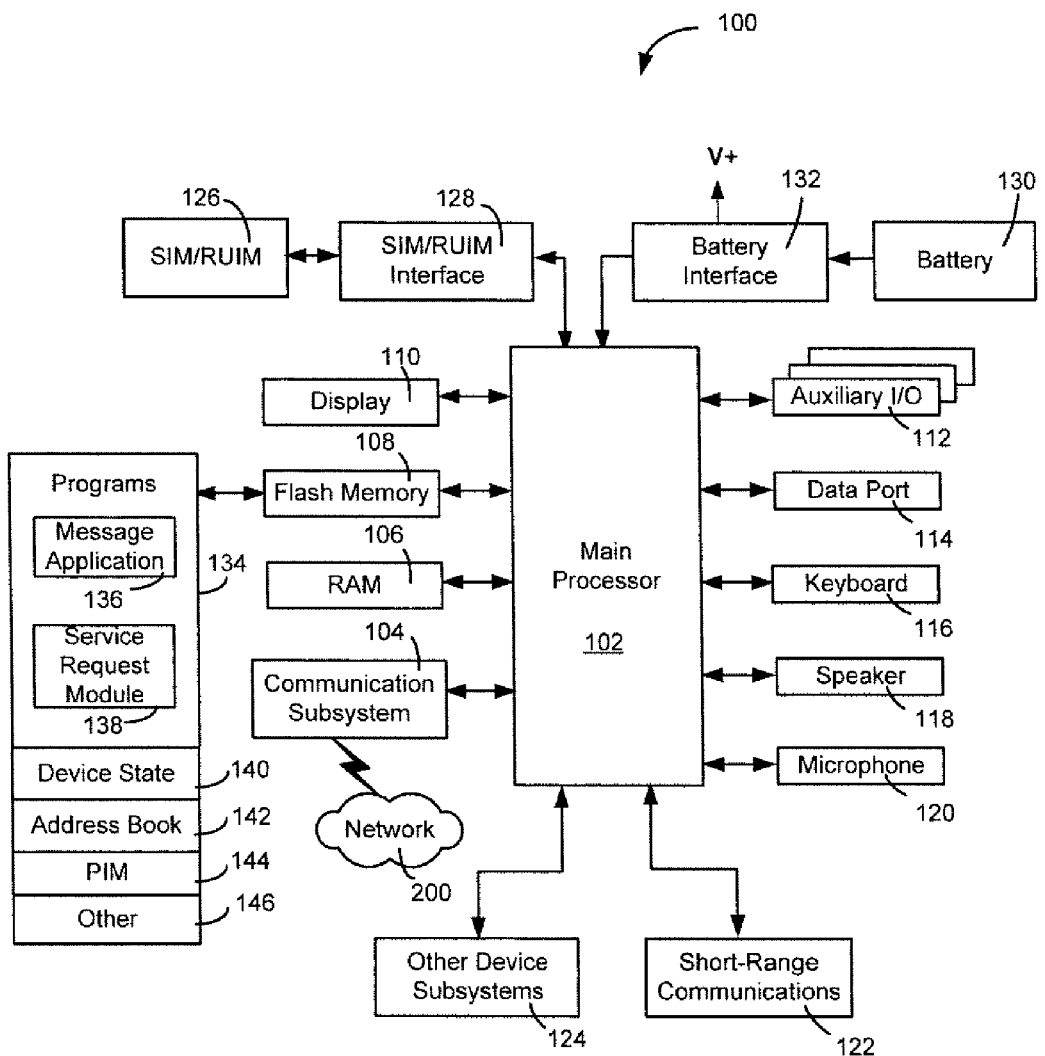
FIG. 1 is a block diagram of an exemplary embodiment of a mobile communication device.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein, but rather as merely describing the implementation of the various embodiments described herein.

The embodiments described herein generally relate to service activation for enabling the usage of a service on a mobile wireless communication device, hereafter referred to as a mobile device. Examples of applicable communication devices include pagers, cellular phones, cellular smartphones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and wireless networks, reference will now be made to FIGS. 1 through 3.

Referring first to FIG. 1, shown therein is a block diagram of a mobile device 100 in one exemplary implementation. The mobile device 100 comprises a number of components, the controlling component being a main processor 102 that controls the overall operation of the mobile device 100. Communication functions, including data and voice communications, are performed through a communication subsystem 104. The communication subsystem 104 receives messages from and sends messages to a wireless network 200. In this exemplary implementation of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with the mobile device 100 is a GSM/GPRS wireless network in one exemplary implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications subsystem 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the wireless network 200, and device-resident functions such as a calculator or task list. Operating system software used by the main processor 102 is typically stored in a persistent store such as the flash memory 108, which may alternatively be a read-only memory (ROM) or similar storage element (not shown). Those skilled in the art will appreciate that the operating system, specific device applications, or parts thereof, may be temporarily loaded into a volatile store such as the RAM 106.

The mobile device 100 may send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all services that the user has already subscribed to. Service activation is described in more detail below. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide power to the mobile device 100.

The main processor 102, in addition to its operating system functions, enables execution of software applications 134 on the mobile device 100. The subset of software applications 134 that control basic device operations, including data and voice communication applications, will normally be installed on the mobile device 100 during its manufacture. The software applications 134 can include a message application 136 as well as several other applications such as an Internet browser, a word processing application, a scheduling program and the like. The software applications 134 can also include applications that support functionality provided by the mobile device such as voice mail services, biometric scanning services, IP modem services and the like.

The message application 136 can be any suitable software program that allows a user of the mobile device 100 to send and receive messages. Various alternatives exist for the message application 136 as is well known to those skilled in the art. Messages that have been sent or received by the user are typically stored in the flash memory 108 of the mobile device 100 or some other suitable storage element in the mobile device 100. In some embodiments, some of the sent and received messages may be stored remotely from the mobile device 100 such as in a data store of an associated host system that the mobile device 100 communicates with.

Another program that is executed by the mobile device 100 is a service request module 138 that allows the user to view a list of available services that can be used on the mobile device 100. The user can then choose to activate one of the available services. This includes selecting a usage amount for the selected service. The term usage amount covers both the cases in which the user specifies a time duration for using the selected service as well as the cases in which the user specifies an amount of use such as the amount of data sent in a messaging application. The service request module 138 can then send a service activation message to a mobile network service activation system to enable the service. This process is described in more detail below. The service request module 138 can operate in combination with the message application 136 for sending the service activation message.

The mobile device 100 further includes a device state module 140, an address book 142, a Personal Information Manager (PIM) 144, and other modules 146. The device state module 140 provides persistence, i.e. the device state module 140 ensures that important device data is stored in persistent memory, such as the flash memory 108, so that the data is not lost when the mobile device 100 is turned off or loses power. The other modules 146 may include a configuration module (not shown) as well as other modules that can be used in conjunction with the SIM/RUIM interface 128.

The address book 142 provides information for a list of contacts for the user. For a given contact in the address book, the information can include the name, phone number, work address and e-mail address of the contact (i.e. contact address), among other information. The address book 142 provides an example of a local data store of contact addresses that can be used by the user of the mobile device 100 when composing an e-mail message.

The PIM 144 has functionality for organizing and managing data items of interest to a subscriber, such as, but not limited to, e-mail, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications may also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 can include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
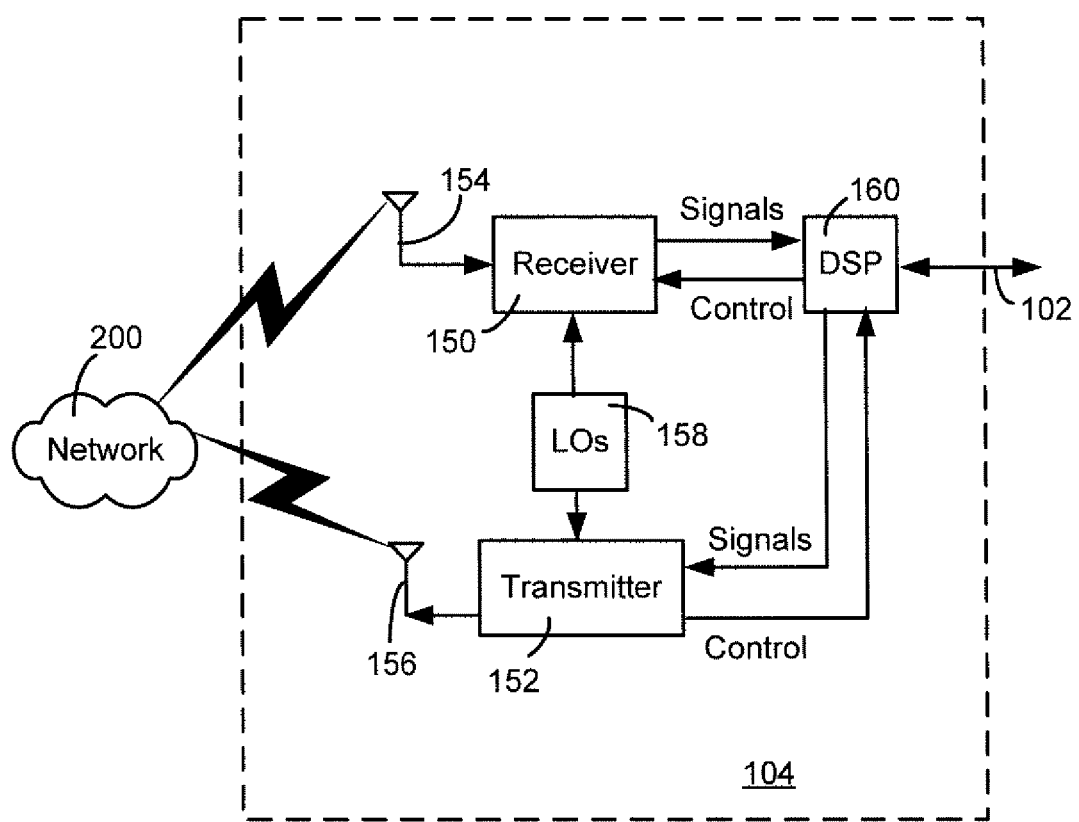
FIG. 2 is a block diagram of a communication subsystem component of the mobile communication device of FIG. 1.

Referring now to FIG. 2, a block diagram of the communication subsystem component 104 of FIG. 1 is shown. The communication subsystem 104 comprises a receiver 150 and a transmitter 152, as well as associated components such as one or more embedded or internal antenna elements 154, 156, Local Oscillators (LOs) 158, and a processing module such as a Digital Signal Processor (DSP) 160. As will be apparent to those skilled in the field of communications, the particular design of the communication subsystem 104 is dependent upon the communication network with which the mobile device 100 is intended to operate. Thus, it should be understood that the design illustrated in FIG. 2 serves only as one example.

Signals received by the antenna 154 through the wireless network 200 are input to the receiver 150. The receiver 150 can perform such common receiver functions as signal amplification, frequency down conversion, filtering, channel selection, and analog-to-digital (ND) conversion. A/D conversion of a received signal allows more complex communication functions such as demodulation and decoding to be performed by the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 can be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100. Accordingly, when the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 3:
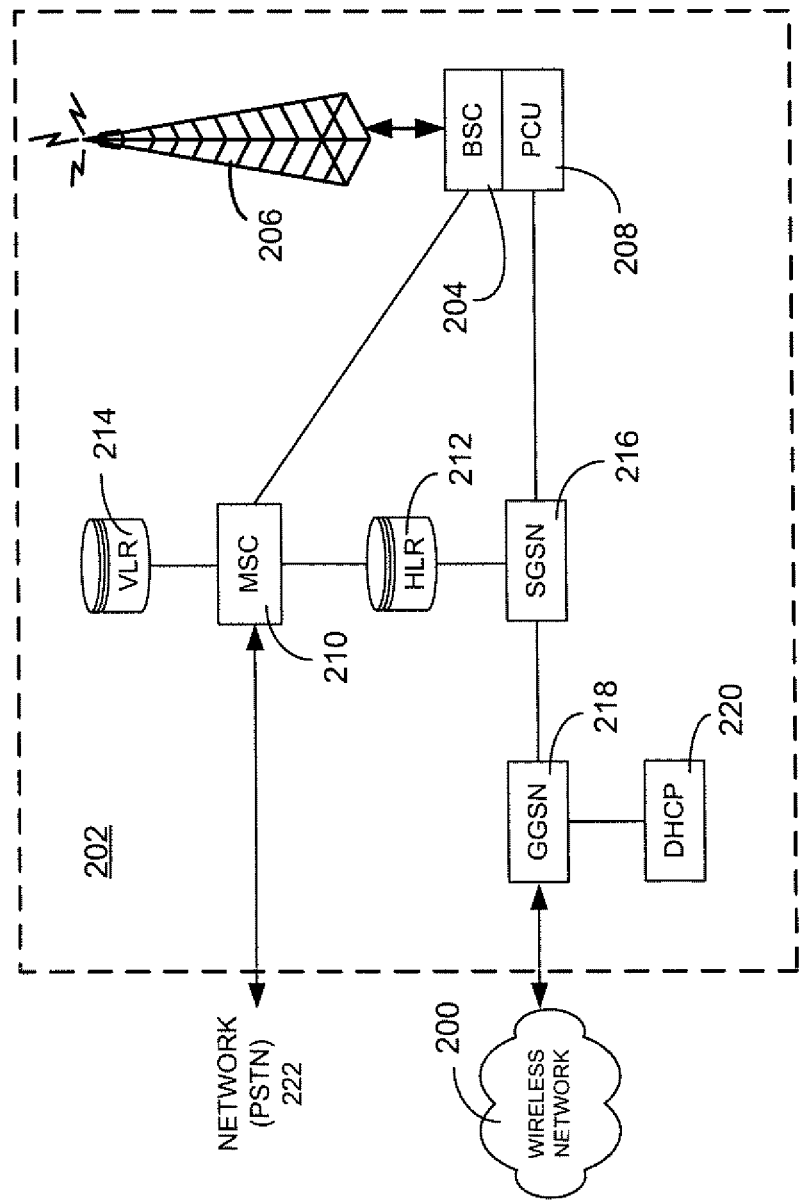

Referring now to FIG. 3, a block diagram of an exemplary implementation of a node of the wireless network 200 is shown as 202. In practice, the wireless network 200 comprises one or more nodes 202. The mobile device 100 communicates with the node 202. In the exemplary implementation of FIG. 3, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the wireless network 200.

In a GSM network, the MSC 210 is coupled to the BSC 204 and to a landline network, such as a Public Switched Telephone Network (PSTN) 222 to satisfy circuit-switching requirements. The connection through PCU 208, SGSN 216 and GGSN 218 to the wireless network 200 (also referred to herein generally as a shared network infrastructure) represents the data path for GPRS capable mobile devices. The wireless network 200 can be a public or private network (i.e. the Internet). In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 is a fixed transceiver station. The station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. The communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR node to the VLR 214, the amount of traffic between these nodes can be reduced so that voice and data services can be provided with faster response times and at the same time require less use of computing resources.

The SGSN 216 and GGSN 218 are elements added for GPRS support; namely packet switched data support, within GSM. The SGSN 216 and MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the wireless network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 to be connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from the mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the wireless network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) contexts and there are a limited number of these available in the wireless network 200. To maximize use of the PDP Contexts, the wireless network 200 will run an idle timer for each PDP Context to determine if there is a lack of activity. When the mobile device 100 is not using its PDP Context, the PDP Context can be de-allocated and the IP address returned to the IP address pool managed by the DHCP server 220.

Figure 4:
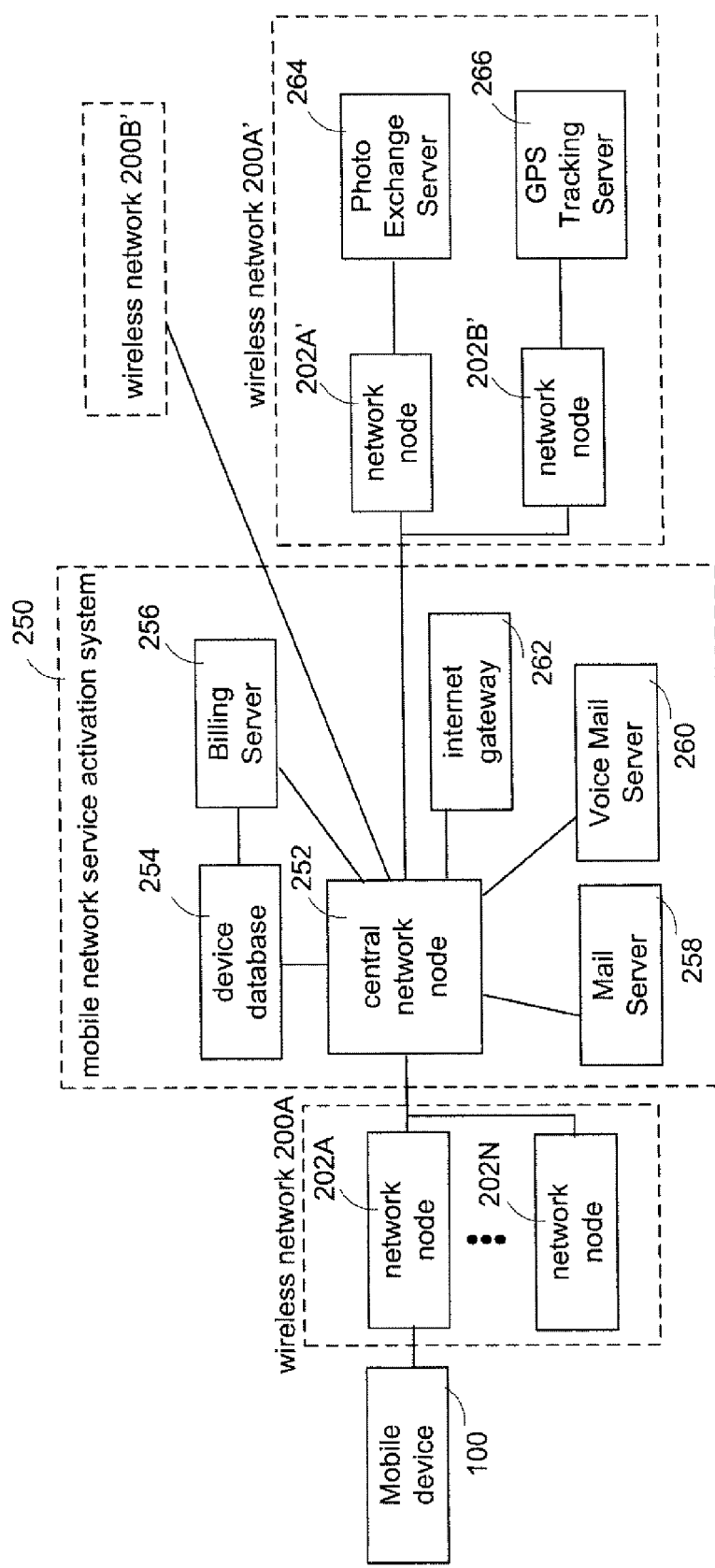
FIG. 4 is a block diagram of an exemplary embodiment of a mobile network service activation system interfaced with various network services.

Referring now to FIG. 4, shown therein is a block diagram of an exemplary embodiment of a mobile network service activation system 250 interfaced with various network services and various components of the wireless network 200. The system 250 allows users to select a particular mobile device service when needed for a particular usage amount. In some embodiments, the user can select from a list of mobile device services that are displayed on the display 110 of the mobile device 100. Once the user confirms the selected service and the usage amount, the mobile network service activation system 250 can enable the selected service for the usage amount. In some cases, this can be done once the user has paid for the selected service. The actual service usage can then be tracked, and once the usage amount has expired the selected service can be disabled from a central location. Expiration of the selected service is related to the specified usage amount. For instance, if the specified usage amount is an amount of time, then expiration occurs after the amount of time has transpired. In other cases, if the specified usage amount is an amount of transmitted data, then expiration occurs once the user sends or receives the amount of transmitted data. The service selection is flexible enough to be initiated from a mobile device 100 that can access the system 250 from different geographic locations (such as different parts of the world), thus providing the user with maximum flexibility as to when and where they request the selected service.

The mobile network service activation system 250 includes a central network node 252, a device database 254, and a billing server 256. In some instances, the billing server 256 is provided at a central location along with the central network node 252 and the device database 254. In other instances, the billing server 256 can be located at a remote location compared to the device database 254 and the central network node 252. In some of these cases, the billing server 256 can be provided by a third party network provider such as a carrier network. In some cases, a carrier network can be an outsourced third party that can provide one or more services to the mobile devices 100. In some cases, the carrier network may have their own billing services that the billing server 256 can communicate with to ensure that the user is properly billed for usage of the selected service. Further, the connection between the billing server 256 and the device database 254 is optional.

The mobile network service activation system 250 can further include one or more servers for providing an application service to users that can access the mobile network service activation system 250. In this exemplary embodiment, the system 250 further includes a mail server 258, and a voice mail server 260. The system 250 further includes access to other services that can be provided through a gateway such as an Internet gateway 262. The Internet gateway 262 acts as an entrance point to other network components or to other networks such as a carrier network (both not shown) for providing a service. Other examples of gateways include an Instant Messaging (IM) gateway and a Short Messaging Service (SMS) gateway. The mail server 258 allows users associated with the system 250 to send and receive e-mail messages. The voice-mail server allows users associated with the system 250 to receive voice-mail on mobile devices that support voice communication. The Internet gateway 262 allows users associated with the system 250 to browse the Internet. There can also be a generic service gateway (not shown) that can connect to additional gateways, such as a Short Messaging Service (SMS) gateway and/or a Multi-Media Service (MMS) gateway, to provide additional functionality.

Other embodiments of the system 250 can include other servers for providing other services to users that can access the system 250 through a carrier network. In these cases, the system 250 provides a central infrastructure for providing network services to these users while reducing the infrastructure overhead for carrier network providers. It should be understood that further components can be included in the system 250 as is understood by those commonly skilled in the art, but have been left out to simplify the description of these embodiments.

Some embodiments of the system 250 also include services that are not centralized and can be provided by third parties. Example of these services are the photo exchange and GPS tracking services that are provided by a photo exchange server 264 and a GPS tracking server 266, respectively. In some implementations, the servers 264 and 266 can be provided by a different carrier network provider that provides the wireless network 200A'. The server 264 can be accessible by a network node 202A' and the server 266 can be accessible by a network node 202B' in this example. In some instances, the network node 202A' can be connected to both servers 264 and 266. There can also be other additional wireless networks 200B' that the system 250 is connected with to gain access to other similar services as well as to gateways that can provide additional services such as video conferencing and push-to-talk like services, and the like.

The photo exchange service provided by the photo exchange server 264 is one example of a combined device-network service. If the user has a mobile device with an integrated camera, the user can request the photo exchange service provided by the photo exchange server 264. The camera integrated into the user's mobile device is then activated and pictures can be exchanged through the photo exchange service, which could be an MMS Gateway in some cases.

The GPS tracking service provided by the GPS tracking server 266 is another example of a device-network service. When the user requests the GPS tracking service, GPS information for the mobile device 100 is delivered to the GPS Tracking server 266. This information can then be delivered to a corporation that tracks the mobile devices 100. Alternatively, authorized personnel may be able to access the GPS information to view the location of the mobile device 100. The GPS service can also be used for location-based purposes. For example, tourists in a foreign city can select the GPS service in order to obtain information on their location so that they can visit nearby tourist sites and avoid getting lost.

FIG. 4 does not show services that are local to the mobile device 100 such as Internet Protocol (IP) Modem services, biometric scanning services and other locally available services. A service like the IP Modem service is important since it allows traditional cell phones, smart-phones or multi-purpose personal digital assistants to connect to a personal computer (PC) or laptop and provide IP connectivity and high-speed data connections. IP Modem services are considered to be a very important service as network bandwidth increases and 3G and 4G networks become a reality. The IP Modem functionality will add a greater data load on existing network infrastructure, and as such may also provide an additional revenue stream to network carriers. Network carriers may charge subscribers an extra premium for the privilege of taking extra capacity within their networks.

It should be noted that there are some embodiments in which all of the network services can be provided at a central location. There can also be some embodiments in which some of the network services are provided at a central location and some of the network services are provided at a remote location. There can also be other embodiments in which all of the network services can be provided from remote locations (in these cases the system 250 does not include the servers 258-260 and the gateway 262; rather these elements are provided by components external to the system 250 but connectable to the central network node 252).

Various network service providers (i.e. carrier network providers) can provide the wireless networks 200A' and 200B'. The wireless networks 200A' and 200B' can be a wireless packet data service network that may be implemented as a General Packet Radio Service (GPRS) network that provides a packet radio access for mobile devices using the cellular infrastructure of a Global System for Mobile Communications (GSM)-based carrier network. In other implementations, the wireless networks 200A' and 200B' may comprise an Enhanced Data Rates for GSM Evolution (EDGE) network, an Integrated Digital Enhanced Network (IDEN), a Code Division Multiple Access (CDMA) network, a Universal Mobile Telecommunications System (UMTS) network, or any $3^{rd}$ Generation (3G) network.

The carrier network provider can also provide at least some of the network services. It should further be noted that the mobile network service activation system 250 can be used with various carrier network providers which can be located in different parts of the world. Accordingly, if a user associated with the system 250 uses a first carrier network provider and then travels to a new geographical area that is not serviced by the first carrier network provider, the user can interface with the system 250 to access a network service through a second carrier network provider who services the new geographical area that the user is currently in. Furthermore, since the user will only be in the new geographical area for only a limited amount of time, the user can advantageously order the network service for a specified amount of time or for a specified amount of data usage that will last during the user's stay in the new geographical area.

The mobile devices 100 communicate wirelessly with the mobile network service activation system 250 through the network nodes 202A-202N of a wireless network 200A. Only one mobile device 100 and wireless network 200A are shown in FIG. 4 for simplicity but it should be understood that there are a plurality of mobile devices 100 and there can be a plurality of wireless networks (not shown) that are connectable to the system 250. In some cases, the wireless network 200A can be the same as the wireless network 200A'.

The network nodes 202 communicate with the central network node 252 to exchange voice, data and/or control operations. The central network node 252 may include one or more nodes and provide several major functional services including, but not limited to, routing services, authentication services and roaming services. The central network node 252 can also identify information in messages sent from the mobile devices 100 and route the message to the appropriate system component or carrier network provider for that matter.

The central network node 252 also interacts with the device database 254 to save various device information, available services, authorization settings and other key operational parameters regarding the mobile devices 100. The device database 254 is accessible by the billing server 256. The device database 254 may also be accessed by other services and network components that are able to access the system 250 through gateways, nodes 202 or the wireless networks 200A-200B'.

Figure 5:
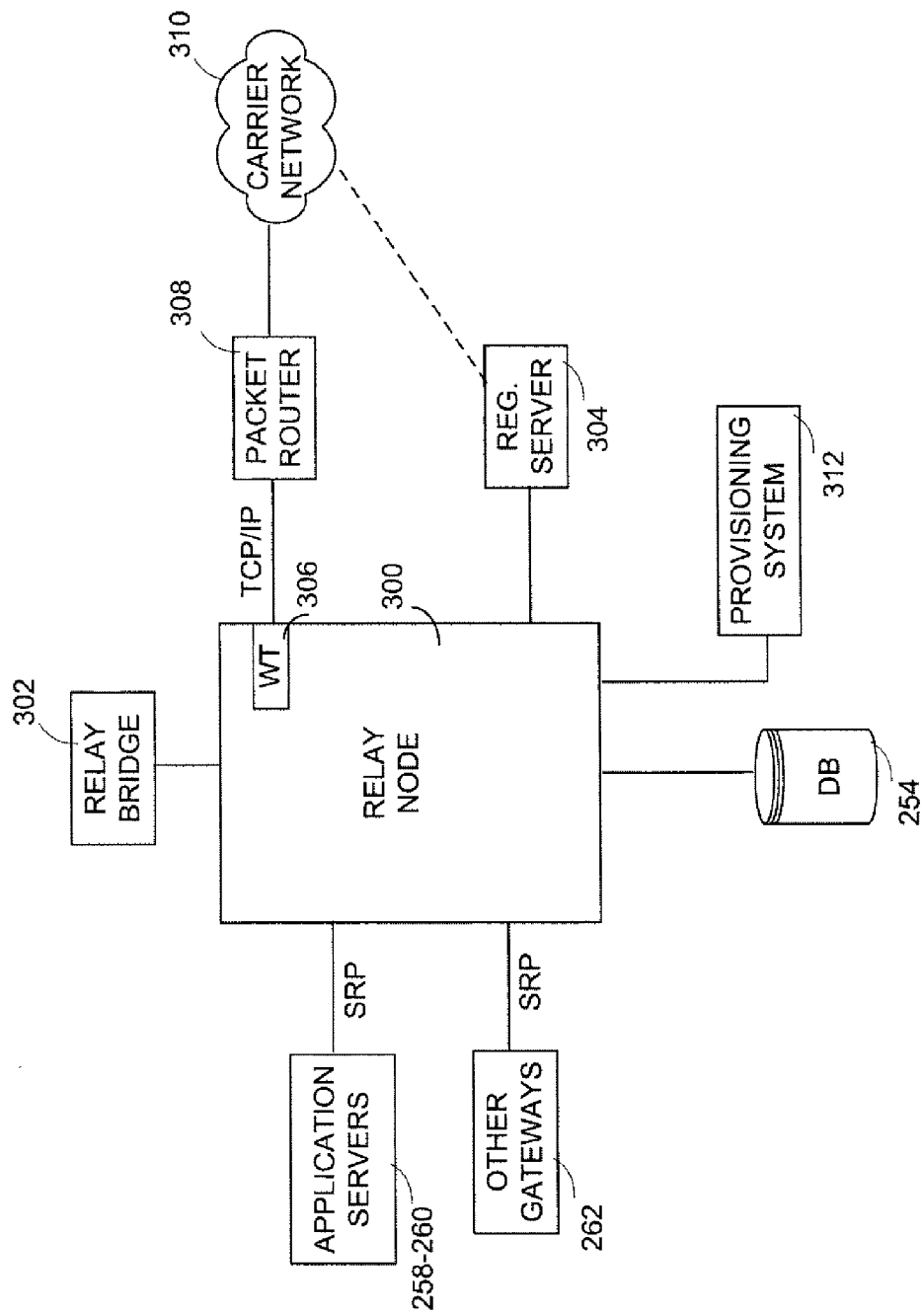
FIG. 5 is a block diagram illustrating an exemplary embodiment of a relay node that can be used in the mobile network service activation system of FIG. 4.

Referring now to FIG. 5, shown therein is a block diagram illustrating an exemplary embodiment of a relay node 300 that can be used to implement the central network node 252 in some implementations of the system 250. The relay node 300 provides connectivity between the mobile devices 100 and various network services, regardless of the geographic location of the mobile devices 100 and the respective carrier network providers. Communication between the relay node 200 and the various application servers 258-260 and gateway 262 can be implemented using any suitable protocol, e.g., Server Relay Protocol (SRP), preferably over IP links.

In some implementations, there can be multiple relay nodes connected to one another according to a distributed network architecture. Accordingly, a relay bridge 302 may be connected with the relay node 300 for supporting inter-relay connectivity. In some implementations, the relay bridge 302 connects with separate relay node sites, forming tunnels between different relay nodes over which messages can flow between services and mobile devices 100, irrespective of the region in which the mobile device 100 is in.

Additionally, the device database 254 is in operable connection with the relay node 300 for handling and managing mobile device 100 location information. In some implementations, this location information can be stored by Personal Identification Number (PIN) indicia of the mobile devices 100, which may be programmed into the mobile devices 100 at the time of manufacture or dynamically assigned afterwards. The location information can include the last known location for each mobile device.

A registration server 304 can be used to provide registration services for when mobile devices 100 are initially activated or when the user of a given mobile device 100 re-registers due to moving to a different wireless network coverage area. In some implementations, the location information of the registration server 304 may be programmed into the mobile devices 100. When a particular mobile device 100 registers successfully, the registration server 304 can provide the location of the relay node 300, so that data can be sent between the particular mobile device 100 to the relay node 300.

A wireless transport (WT) interface 306 is provided as part of the relay node 300 for connecting with a wireless carrier network that service the mobile devices 100. The WT interface 306 can communicate with a respective packet router using TCP/IP links, in some implementations, which route data packets to and from respective wireless packet data service networks, exemplified in FIG. 5 as carrier network 310. To facilitate accurate routing, the packet router 308 can use the current IP address of a particular mobile device 100 for addressing a data packet. It should be understood that there can be multiple sets of WT interfaces 306 and packet routers 308 for servicing different carrier networks.

The registration server 304, which handles administration and registration services for mobile devices 100, may also be provided with separate WT and packet routing for interfacing with the carrier network 310, although this is not specifically shown. A provisioning system 312 may be co-located or otherwise associated with the relay node 300 for setting up and managing various service providers (i.e. carrier networks), subscribers, mobile device manufacturers, resellers, and other entities in order to support any number of service and market differentiation requirements. Additionally, the provisioning system 312 may include logic for provisioning personalized indicia (e.g. PIN assignment and management) with respect to the mobile devices 100. Also, subscriber validation logic may be provided as part of the provisioning system 312.

Figure 6:
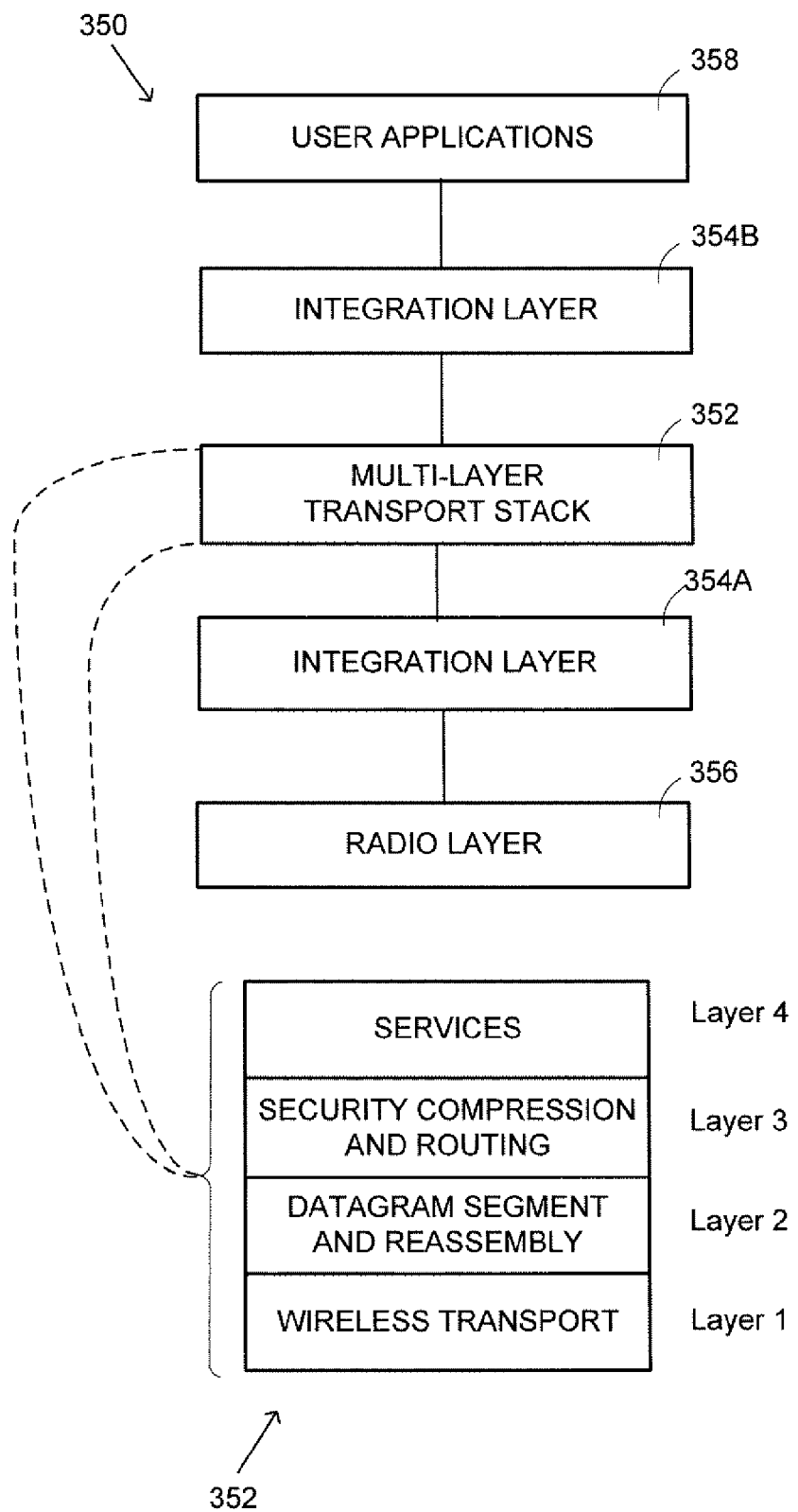
FIG. 6 is an illustration of an exemplary embodiment of a communications scheme that can be used by the relay node of FIG. 5.

Referring now to FIG. 6, shown therein is an illustration of an exemplary embodiment of a communications scheme 350 that can be used by the central network node 252 and the mobile devices 100. The communications scheme provides connectivity between a mobile device 100 and a network server or gateway to allow a mobile device 100 to access a service or otherwise communicate with network components.

The communications scheme includes a multi-layer transport stack 352 that provides a generic data transport protocol for any type of data, such as email, SMS, MMS, IMS and IP modem services, and various types of communication protocols used in telecommunications networks such as voice mail services, call forwarding, call barring, and call display. The generic transport protocol is implemented via a reliable, secure and seamless continuous connection to a wireless packet data service network.

An integration layer 354A is operable as an interface between a radio layer 356 and the transport stack 352. The radio layer 356 operates in accordance with the communication protocol used by the mobile device 100 and the carrier networks. Likewise, another integration layer 354B is provided for interfacing between the transport stack 352 and the user applications 358 supported on a particular mobile device 100 (e.g. the message application 136, internet browser, etc.).

The bottom layer (Layer 1) of the transport stack 352 is operable as an interface to the carrier network's packet layer. Layer 1 handles basic service coordination within the exemplary network environment shown in FIG. 4. For example, when a given mobile device 100 roams from one carrier network to another, Layer 1 verifies that the packets are relayed to the appropriate carrier network and that any packets that are pending from the previous carrier network are rerouted to the current carrier network. The top layer (Layer 4) exposes various application interfaces to the services supported on a given mobile device 100. The remaining two layers, Layers 2 and 3, are responsible for datagram segmentation/reassembly and security, compression and routing, respectively.

Figure 7:
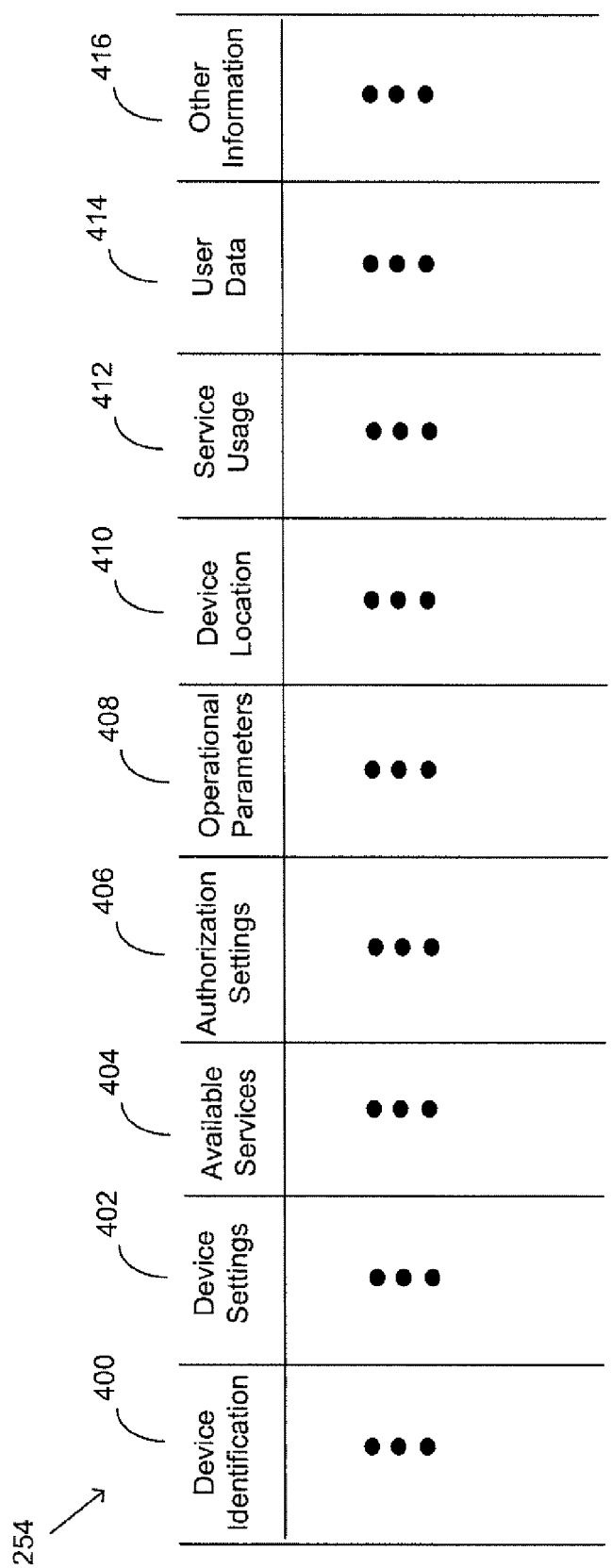
FIG. 7 is a block diagram illustrating fields for an exemplary implementation of a device database that can be used in the mobile network service activation system of FIG. 4.

Referring now to FIG. 7, shown therein is a block diagram illustrating fields for an exemplary implementation of the device database 254. The device database 254 can include a device identification field 400, a device settings field 402, an available services field 404, an authorization settings field 406, an operational parameters field 408, a device location field 410, a service usage field 412, a user data field 414, and an other information field 416. The device database 254 can be considered to have device information in fields 400, 402, 406, 408, 410 and 414 and service information in fields 404, 412 and 414. Field 414 can be considered to have both types of information since this field ties a service together with the user of a device. Each of these fields includes information associated with a particular mobile device. It should be noted that, in some embodiments, one or more of these fields can be optional. Further, it should be noted that an entry in a given field can include more than one item of data such as an array of data.

The device identification field 400 stores an identifier that can be used to uniquely identify the given mobile device. The identifier can be an Electronic Serial Number (ESN), an International Mobile Station Identity (IMSI) number, a PIN number and the like. The device settings field 402 includes information on how the device has been set up to operate and can include information such as the PIN, e-mail address, serial number, and the like for the device. The available services field 404 includes a list of the network and device services that are available for the given mobile device. Network services are those available through the network(s) associated with the mobile network service activation system 250. Device services are those available on the device itself such as an IP modem service, and the like.

The authorization settings field 406 can include user authentication information such as user account information, login/password information, credit card information, and the like. The operational parameters field 408 can include information on the home carrier network provider, and any restriction on device use with the home carrier network provider such as using the device in North America only, being able to make only outgoing calls in certain situations, etc. The device location field 410 includes information on the current location of the given mobile device. The service usage field 412 can be used to track the actual service usage by a mobile device for one or more requested services. Accordingly, this field can include a two dimensional array of data where a given index into the array represents a given service, a first array value at the given index represents the current service usage in time or data usage, and the second array value at the given index represents the specified total amount of service usage in time or data usage. The values in this field 412 can be updated in different ways as explained further below.

The user data field 414 includes information on the user associated with the given mobile device. The user data can include a billing address for the user. The user data can also include monetary information for the user such as a credit card number or a bank account number that can be used by the billing server 256 to bill the user.

The other information field 416 can include any other information related to the user or the device such as, for example, associated accounts/numbers (e.g. spouse, kids, etc.), company and title, the IT administrator's name and contact information, etc.

The billing server 256 can provide a list of the network services which are available via the network components that are associated with the mobile network service activation system 250. The list of network services can be stored in the available services field 404 in the device database 254 and updated periodically or quasi-periodically. Examples of network services that can be available include telecommunications services and data services. Telecommunications services include, but are not limited to, voice mail, call forwarding, call blocking and push-to-talk services that allow the mobile devices to function as walkie-talkies. Data services include, but are not limited to, photo exchange services, global positioning services (GPS), short message services (SMS), multimedia message services (MMS), Internet Protocol (IP) modem services, and video conferencing.

The billing server 256 can also bill a user for a selected service, and in some cases, upon payment, then activate the service, track service usage, and deactivate the selected service when appropriate. Since various pricing strategies may be associated with the various services, the billing server 256 can include information on the costs associated with the different available services. Accordingly, the billing server 256 will have access to the services that are enabled for a given mobile device 100, and the cost structure associated with the use of the services. For example, certain services may have costs structures associated with the extent of usage of the service, and others may have cost structures associated with the duration of usage, and some cost structures may be a combination of both. Further, the rates that are charged for voice or data services may vary depending on certain circumstances, i.e. due to an increased amount of use. Accordingly, the billing server 256, along with determining costs for services that have been used, can also provide cost estimates for services that may be offered depending on their duration and usage.

Service usage can be tracked in several ways. For services that are offered on the mobile device itself, service usage can be tracked via the service request module 138. The service usage information can then be sent by the mobile device 100 to the central network node 252 where, in some implementations, the usage information can be stored in an appropriate field in the device database 254, or in some implementations, the usage information can be provided to the billing server 256 for storage on an associated data store. There can be some implementations where both of these operations can be done to track service usage. For a network service, such as accessing the internet via the internet gateway 262 or sending and receiving e-mail messages via the mail server 258, each time a given mobile device accesses the service, there will be data flow between the given mobile device, the central network node 252 and the network component associated with the service. Accordingly, the central network node 252 can track usage in these cases by, in some implementations, updating usage data in the device database 254, or in some implementations, by updating usage data in a data store associated with the billing server 256. In some implementations, both operations can be done.

In some cases, since the specified service usage is an amount of time, such as a number of days, for example, the service usage can be tracked by keeping track of the starting day on which the selected service is activated, calculating the ending day on which the selected service is to be deactivated, and then keeping track of the current day. Once the current day equals the ending day, the selected service can be deactivated. Once again, this information can be stored in an appropriate field in the device database 254 and/or in a data store associated with the billing server 256.

Figure 8:
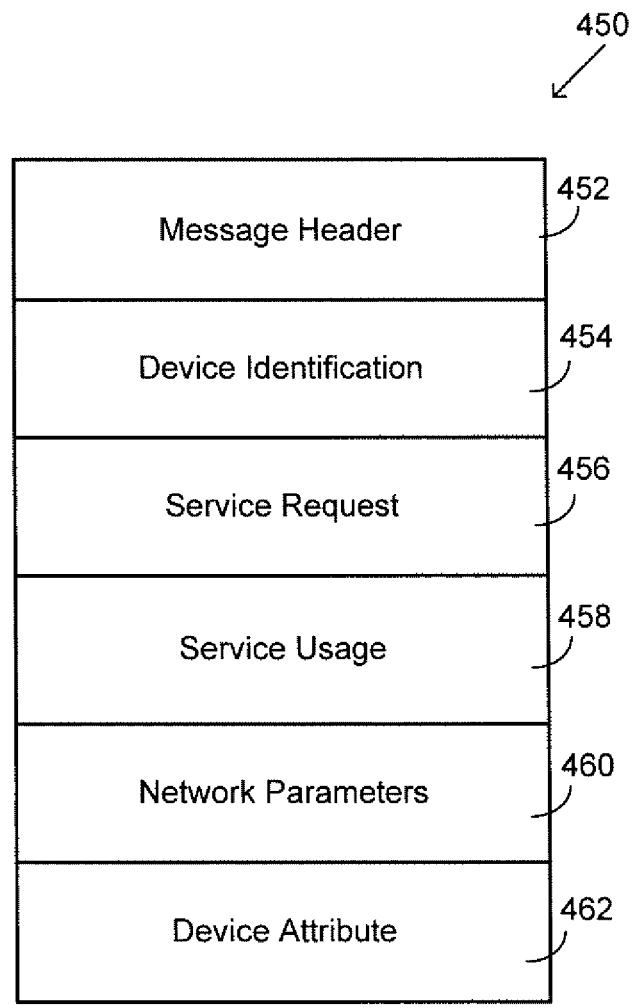
FIG. 8 is a diagram illustrating an exemplary embodiment of the contents of a service activation message.

Referring now to FIG. 8, shown therein is an exemplary embodiment of the contents of a service activation message 450. The contents shown in the service activation message 450 are to be considered as a general example, and there are instances in which messages can be sent from the service request module 138 to the central network node 252 which resemble the service activation message 450 but do not include all of the fields shown in FIG. 8. This will depend on the stage of service activation (this is explained in more detail below). Accordingly, the format and content of messages sent by the service request module 138 may differ. In general, the service activation message 450 includes a message header field 452, a device identification field 454, a service request field 456, a service usage field 458, a network parameters field 460 and a device attribute field 462. As mentioned, some of these fields are optional.

The message header field 452 contains data that is included in typical message headers such as addressing information (i.e. where the message should be sent to), message length indicators, and encryption and signature scheme identifiers, if applicable. The device identification field 454 is a unique identifier associated with the mobile device 100 for which the service request module 138 generates the service activation message 450. Examples of unique identifiers include, but are not limited to, the Electronic Serial Number (ESN), the International Mobile Station Identity (IMSI) number, PIN numbers and the like.

The service request field 456 includes identifiers that are used to identify the selected service for which the user is requesting activation. The identifier in the service request field 456 may be a string of characters, a numeric identifier or a combination of both. The service usage field 458 indicates the time duration or the amount of data usage for which the service is requested.

The network parameters field 460 includes information on the wireless network that the user is currently interfacing with to communicate with the central network node 252. This depends on the geographical location of the user and provides an indication of where the service is being requested from. Accordingly, this field can also include information on the geographical location of the user. The device attribute field 462 includes information pertaining to the mobile device 100 from which the service request is being made, including the type of the mobile device (i.e. the make, the model, etc.).

Figure 9:
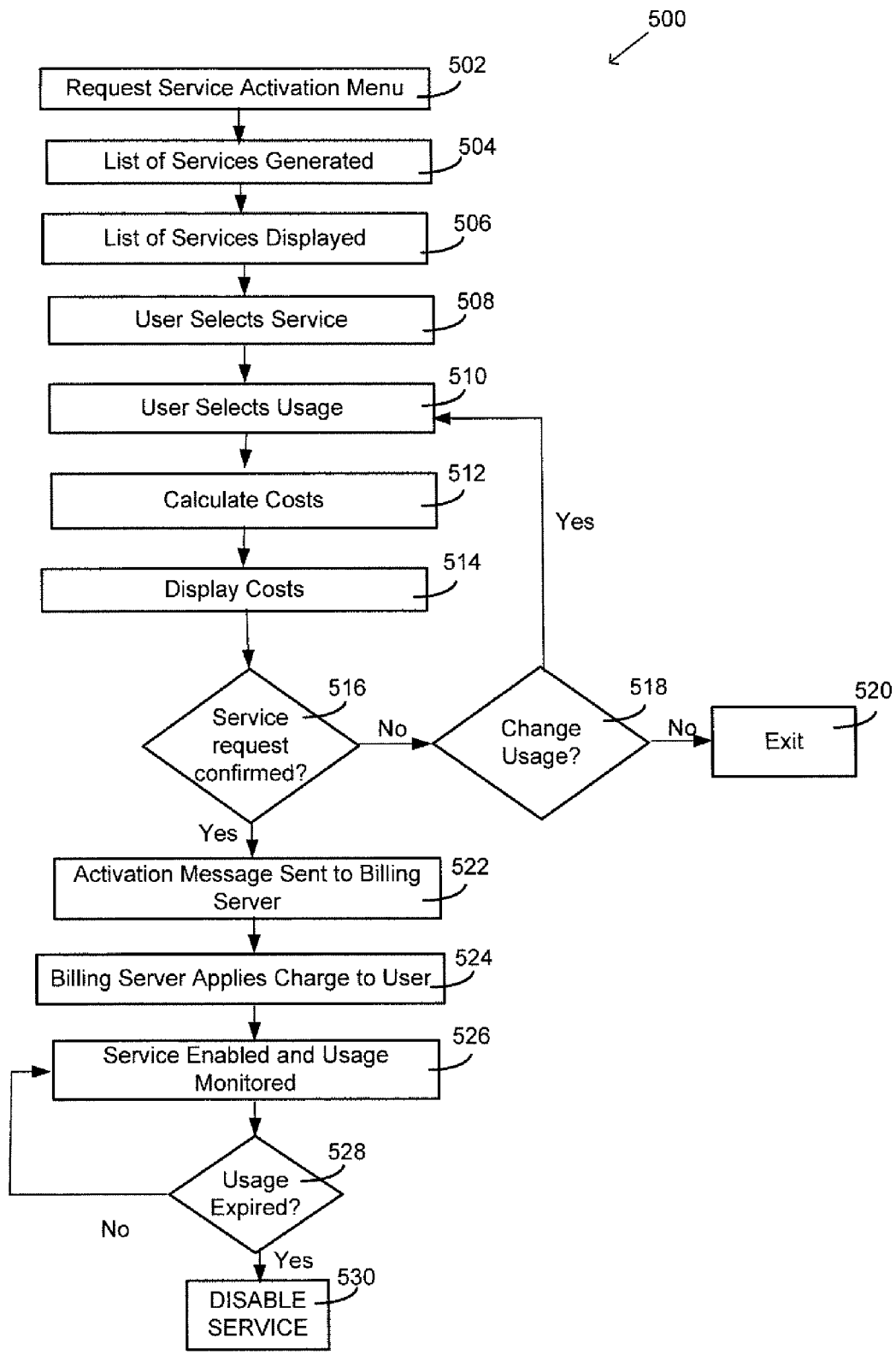
FIG. 9 is a flowchart diagram illustrating an exemplary embodiment of a service activation method.

Referring now to FIG. 9, shown therein is a flowchart diagram illustrating an exemplary embodiment of a service activation method 500. At least some of the processing steps of the service activation method 500 are performed by the service request module 138 executing and residing on one of the mobile devices 100, where various versions of a service activation message can be constructed and sent to the central network node 252. Further processing steps in the method 500 are then performed by the central network node 252 and the billing server 256.

The service activation method 500 begins at step 502 where the user requests that a service activation menu be displayed. At step 504, a list of available services is generated. The list of available services may be previously stored on the mobile device 100. For instance, the billing server 256, via the central network node 252, may send a list of network services that are available to the mobile device 100. This can be done in a periodic fashion or each time that a new service is made available for use by the mobile device 100. In some embodiments, the service request module 138 can periodically query the billing server 256, via the central network node 252, to obtain an updated list of network services. The list of network services can then be stored in the flash memory 108 or the memory associated with the SIM card 126. In some embodiments, the interaction can be just between the central network node 252 and the given mobile device 100 since the central network node 252 can access the device database 254 to obtain a list of available services. Further, in some embodiments, upon the user selecting the option of activating the network services menu, the service request module 138 can send a request for a list of available services for use by the mobile device 100. In any of these cases, the query made by the service request module 138 to the billing server 256 can be in the form of the service activation message 450 and can include the fields 452, 454, 460 and 462. Field 456 can also be included with a special identifier to indicate that a list of available network services is being requested.

It should be noted that the list of available services also includes the device services that are available on the mobile device 100 itself. The device services are already implemented on the mobile device 100 but in some cases may not yet be activated. A list of device services can be stored on the mobile device 100 and then combined with the list of network services received from the billing server 256 to form the list of available services.

It should further be noted that different mobile devices may have a different list of available services depending on the capabilities of the mobile devices. For example, a given mobile device might not have an integrated camera and thus will be unable to activate the Photo Exchange service. Accordingly, the list of available services is specific to the mobile device and matches the capabilities and functions of the mobile device with the service capabilities associated with the system 250.

Figure 10:
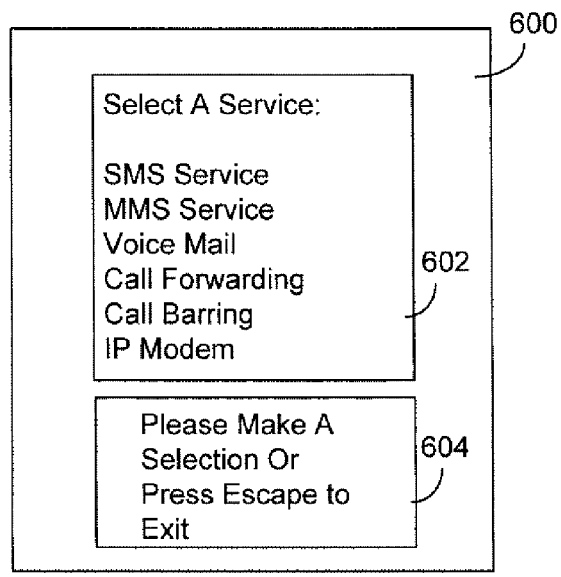
FIG. 10 is a block diagram of an exemplary embodiment of a service activation menu.

The service request module 138 then displays the service activation menu on the display 110 of the mobile device 100 at step 506. FIG. 10 shows an exemplary embodiment of a service activation menu 600. The service activation menu 600 includes a dialog box 602 with a list of available services that a user may select for use on the mobile device 100. In this example, the list of available services include SMS service, MMS service, Voice Mail service, call forwarding service, call barring service, and IP modem service. Other advanced services which may also be available to the mobile device 100 (but are not shown in FIG. 10) include GPS tracking services, biometric scanning services, and/or Internet services. The service activation menu 600 also includes a second dialog box 604 instructing the user to select a service or exit from service activation.

In some embodiments, the service activation menu 600 may be displayed upon the display 110 of the mobile device 100 as a web page, which has been generated by components external to the mobile device 100 and displayed in response to a request for available services by the service request module 138. When the information is presented to the user through a web interface, it can be encrypted through a suitable encryption means such as an SSL (secure socket layer) connection, for example. If the list of available services is provided as a web page, then a remote server having similar functionality as the billing server 256, can provide the functionality of the service request module 138 and the user can directly interface with the web page to select and activate a service for use on the mobile device 100.

The method 500 then proceeds to step 508 where the user selects a desired service. The user can select the service by highlighting the desired service through input functionality available on the mobile device 100. This may include moving a cursor to the desired service by using appropriate keys, a mouse pad, a touch screen, a thumbwheel, or some other input mechanism. Each of these devices can be referred to as input units. In some implementations, numbers can also be associated with each service, and the user can select the number that corresponds to the service that they wish to select. In some implementations, a dynamic rolling wheel can be provided so that the user can scroll through all of the available choices and select the desired service by pressing a key or pushing on a thumbwheel for example. Once the user selects the service they wish enabled, the method 500 proceeds to step 510. The user could escape out of the service activation menu 600 if they decide not to proceed or have arrived at this screen in error.

Figure 11:
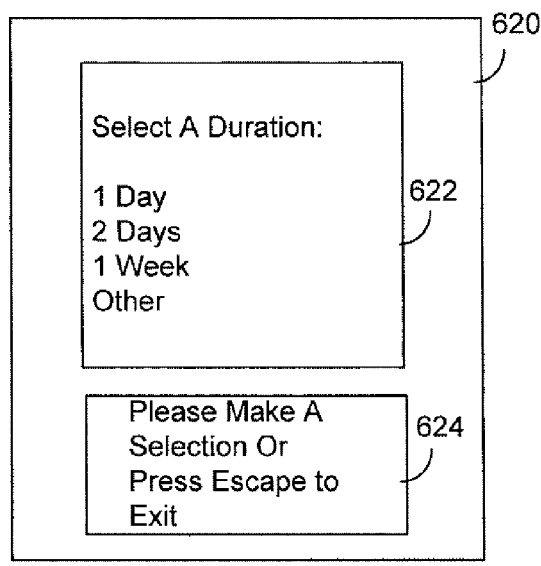
FIG. 11 is a block diagram of an exemplary embodiment of a service usage selection screen; and, FIG. 12 is a block diagram of an exemplary embodiment of a service confirmation screen.

At step 510, depending on the selected service, the user is asked to specify the service usage. The service usage may be a time duration such as a certain number of days, weeks, or months, etc. FIG. 11 shows an exemplary embodiment of a service usage selection screen 620. The service usage selection screen 620 includes a dialog box 622 to provide the user with several predetermined durations. In this example, the user can select 1 day, 2 days or 1 week for the service duration. The user can also specify another duration by selecting the "Other" option (the availability of this option can depend on the particular service that is being selected). The user can select an option in a similar fashion to the service activation menu 600. The service usage selection screen 620 also includes a dialog box 624 that instructs the user to make a selection or to exit the service usage selection screen 620.

In some cases, the cost of the service may be associated with actual data usage and not duration. In these cases, the dialog box 622 can provide several different options for the amount of data usage that can be selected. For example, the user may wish to activate a messaging service for which cost is calculated based on the amount of data transferred, rather than the time duration for which the service is used.

Upon the user specifying the duration of time or the amount of usage for which a service is to be activated, the method 500 then proceeds to step 512. At step 512, the service request module 138 sends another message to the central network node 252, which then sends the message to the billing server 256. The message includes an identification of the selected service and the service usage for the requested service as well as possibly other information. The billing server 256 then determines a cost for the use of the selected service for the specified duration. The calculated cost may be an exact cost in the case of services which are provided for a certain time duration. In some cases, the calculated cost may also be an estimate of the cost that will be associated with the service based on amount of data usage and not the time duration; as such an exact cost cannot be provided, but rather a cost estimate based on usage. For example, if the user wishes to activate a messaging service for which cost is calculated based on the amount of data transferred, the cost may be presented to the user per KB of data transferred.

At step 514, the billing server sends a message having cost information to the mobile device 100 via the central network node 252 and the one or more nodes 202. The message includes the calculated or estimated cost associated with the selected service for the specified service usage. The associated cost is then displayed by the service request module 138 to the user on the display 110 of the mobile device 100.

In some embodiments, the cost information may be included at a data store associated with the central network node 252. Accordingly, rather than having the central network node 252 contact the billing server 256 each time a service request module 138 requests costs information, the central network node 252 can access the data store and provide the cost information to the mobile device that requested the cost information. In these embodiments, the billing server 256 can periodically or quasi-periodically provide cost information to the central network node 252 which can then store the cost information in the associated data store. This reduces the communication overhead associated with selecting a service.

In some embodiments, the cost information may be provided to the mobile device 100 and stored in the flash memory 108 or another local data store. Accordingly, the service request module need not make a request for cost information during steps 512 and 514 of the method 500. In these embodiments, once again, the billing server 256 can periodically or quasi-periodically provide cost information to the mobile device 100 for all available services. This reduces the communication overhead associated with selecting a service.

Figure 12:
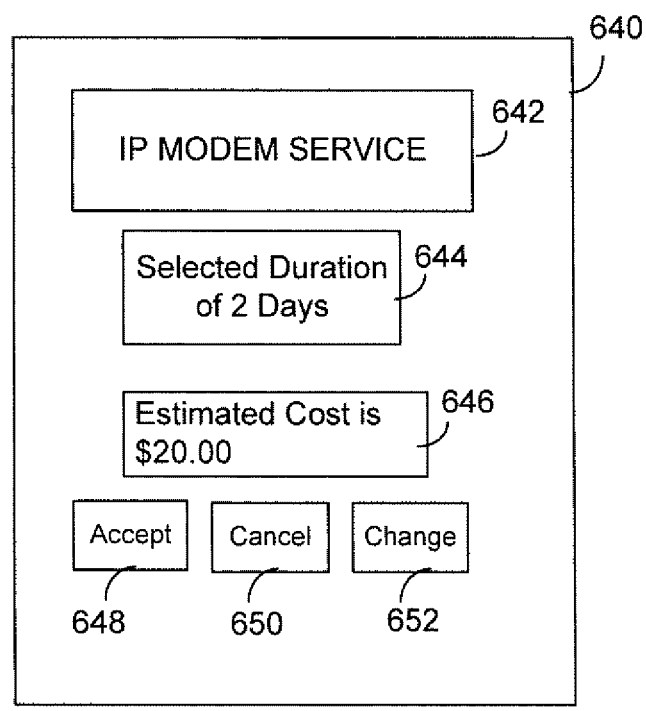

Referring now to FIG. 12, shown therein is a block diagram of an exemplary embodiment of a service confirmation screen 640. The service confirmation screen 640 includes a dialog box 642 indicating the selected service, a dialog box 644 indicating the selected service usage, and a dialog box 646 indicating the associated cost.

The method 500 then proceeds to step 516 where the user confirms whether the selected service is to be activated for the specified service usage. Accordingly, the service confirmation screen 640 provides the user with several option buttons 648-652. If the user accepts the selected service for the specified service usage, the user selects the accept option button 648. If the user does not accept the selected service for the specified service usage, the user selects the cancel option button 650. If the user wishes to edit the service usage use for the selected service, the user selects the change option button 652.

If the user chooses to decline the selected service or change the service usage, the method 500 proceeds to step 518. At step 518, if the user has selected to change the duration information associated with the selected service, the method 500 returns to step 510 where the user specifies a new amount of service usage (i.e. a new time duration or new amount of data use). If at step 518, it is determined that the user has rejected the selected service, the method 500 proceeds to step 520 where the method 500 ends.

If the user confirms the requested service, the method 500 proceeds to step 522 where a service activation message is generated by the service request module 138 and sent to the billing server 256 via one or more nodes 202 and the central network node 252. The service activation message can be in the format specified in FIG. 8 so that it is recognizable to the nodes 202 and 252 and to any other components associated with the host system 250.

However, the service activation message, or any other messages sent by the service request module 138 can also be in the form of a specially formatted SMS or Premium SMS message, or a specialized e-mail message. In any of these cases, the service activation message is formatted so that the central network node 252 knows where to route the message. For instance, the central network node 252 can distinguish between normal SMS messages and premium SMS messages by looking at the header of the message. In some cases, the service activation message may have a special SMS format, and it may be directed to a specific IP address within the host system or associated wireless network, or an address may be contained within the header of the service activation request.

In some cases, the service activation message can be an MMS message, e-mail or proprietary message and in some embodiments, an MMS gateway, e-mail gateway or proprietary message processor may be used in the central network node 252 to detect and properly route the service activation message.

In some cases, the billing server 256 may be decentralized in which case the service activation message is sent to a component external of the host system 250. In some implementations, a carrier network provider may provide the functionality of the billing server 256. This can depend on the particular service being provided. In some implementations, a carrier network provider may also outsource the billing functionality to a third party.

In some cases, a response can be provided from the billing server 256 to the service request module 138. This can be done in the case of access to specific gateway services. If the service activation message does require a confirmation response, the service request module 138 can be programmed to wait for such a response. In other instances, a response does not have to be provided by the billing server 256 or the component that is providing the service.

Once the service activation message is received by the billing server 256, the contents of the service activation message are analyzed to determine the selected service and the specified service usage. In some implementations, the billing server 256 then proceeds to determine whether the user who is requesting the service can pay for the costs associated with the service. In some implementations, the billing server 256 can have an associated data store with a database of user information including user address information and user credit card, banking or other monetary information. Accordingly, when the billing server 256 receives a service activation message, the billing server 256 can access monetary information for the user associated with the service activation message to determine if the user can pay for the costs of the requested service. If the user can pay for the costs of the requested service, the billing server 256 can proceed to activate the service. If the user cannot pay for the costs of the requested service, the billing server 256 can send a message back to the service request module 138 to indicate that the service is denied due to insufficient funds.

In some implementations, the billing server 256 can have an associated data store with user address information and billing information. In these cases, the billing server 256 can enable the requested service and add the cost to the user's billing record. The user can then be billed at a later date.

In these implementations, the billing server 256 generally checks for and updates billing information for the user. The billing information (i.e. the user's address and monetary information) can be obtained when the user first subscribes with the system 250. This information can be stored in the device database 254 and later provided to the billing server 256 when the user first requests use of a service. In some cases, the billing server 256 can generate billing information for a user and store the information in an appropriate data store if the billing information does not exist.

At step 526, the billing server 256 enables the requested service by sending an appropriate message to the server or gateway that provides the service. The message is first sent to the central network node 252, which then relays the message to the appropriate server or gateway. The message indicates that the server or gateway is to allow the mobile device to use the requested service. In some cases, the message may indicate the service usage. In some cases, the message that is sent by the billing server 256 can be the service activation message. In some cases, the billing server 256 can also send another message to the server or gateway to disable the service. In the case of device-specific services, the billing server 256 can send a message to the particular mobile device that requested the service to update some internal parameters which allow the service to be accessed. When the service is no longer to be used, because the service usage has expired, for example, the billing server 256 can send another message to the mobile device 100 to deactivate the service.

In some instances, the activation of a service may require more information from the user of the mobile device 100. In these cases, once the billing server 256 notifies a server or gateway to provide service to a mobile device 100, the server or gateway can then communicate with the user of the mobile device 100 to obtain more information. For example, in the case of a call forwarding service, the server that provides the service can query the user for the number that the user wishes calls to be forwarded to.

At step 528, when the requested service is activated, the user is able to make use of the requested service from the mobile device 100 for the specified service usage. Accordingly, the billing server 256 monitors the usage of the requested service to determine whether the user is still able to make use of the service. In some cases, the billing server 256 can monitor an appropriate field in the device database 254 to determine what the usage has been so far. In other cases, the central network node 252 can check the service usage by checking the device database 254 and then send a message to the billing server 256 when the service usage has expired. Accordingly, the method 500 includes checking to see if the service usage has expired in step 528. The usage expires when the specified time duration for the requested service expires or when the amount of data usage specified for the requested service expires. While the service usage is not expired, the service is enabled and monitored in steps 526 and 528. If the service usage expires in step 528, the billing server 256 can disable the particular service at step 530 but continue to allow the user to use other allowable services on the mobile device.

One skilled in the art will appreciate that the various databases and service logic processing described herein can be implemented using suitable hardware, firmware and/or firmware logic blocks or a combination thereof. Further, the steps of the methods described herein may be provided as executable software instructions stored on computer-readable media, which may include transmission-type media. In addition, the functionality of the relay node may also be integrated within a wireless carrier network, whereby a "network node" may generally comprise the relay layer functionality as well.

In one aspect, at least one embodiment described herein provides a mobile network service activation system for wireless activation of a selected service for use by a user of a mobile device. The system comprises: a central network node connectable to one or more wireless networks for communication with the mobile device and for provision of the selected service to the mobile device; a device database connected to the central network node, the device database including device information for the mobile device and service information for the selected service; and, a billing server connected to the central network node, the billing server activating the selected service for use by the mobile device in response to a service activation message sent by the mobile device to request access to the selected service.

In at least some cases, once the user chooses the selected service from a list of available services and provides confirmation, the mobile device generates the service activation message to include an indication of the selected service, the specified service usage, and device information for the mobile device.

In at least some cases, the billing server checks and updates billing information for the user prior to enabling the selected service.

In at least some cases, the system tracks actual service usage by monitoring data transmission associated with the mobile device and the selected service and records the actual service usage in the device database, and the system deactivates the selected service when the specified service usage expires.

In at least some cases, the system further includes at least one of a server and a gateway for providing the selected service to the mobile device.

In at least some cases, the one or more wireless networks connected to the central network node provide access to at least one of a server and a gateway for providing the selected service.

In at least some cases, the list of available services include voice mail service, call forwarding service, call display service and call barring service.

In at least some cases, the list of available services include short messaging service, multimedia message service, instant messaging service and IP modem service.

In another aspect, at least one embodiment described herein provides a mobile device communication device comprising: a main processor for controlling the operation of the mobile communication device; a communication subsystem connected to the main processor, the communication subsystem being adapted for wirelessly sending and receiving data; a service request module for providing a user with a list of available services for use on the mobile device, and upon the user selecting a service and confirming the selected service, the service request module generates a service activation message including an indication of the selected service and sends the service activation message to a mobile network for enabling the selected service; and, an input unit for allowing the user to select and confirm the service.

In at least some cases, the service activation message further includes a specified service usage for the selected service.

In at least some cases, the service activation message further includes device information for the mobile device.

In at least some cases, the input device includes at least one of a keyboard, a thumbwheel, a mouse, a joystick, and a touch screen.

In another aspect, at least one embodiment described herein provides a service activation method for allowing a user to request a selected service from a wireless network for use on a mobile device. The method comprises:

a) providing a list of available services to the user from which the user can choose the selected service;

b) generating a service activation message including an indication of the selected service and a specified service usage; and, c) sending the service activation message to a billing server associated with the wireless network.

In at least some cases, step (a) of the method further includes allowing the user to specify the service usage, and then providing the user with a cost estimate based on the selected service and the specified service usage.

In at least some cases, step (a) of the method further includes providing the user with options for confirming the selected service, declining the selected service and changing the specified service usage.

In at least some cases, the method further comprises:

d) checking and updating billing information for the user based on the selected service and the specified service usage; and, e) sending a message to an appropriate network component to activate the selected service for use by the mobile device.

In at least some cases, the method further comprises:

f) tracking actual service usage of the selected service; and g) disabling the selected service when the specified service usage expires.

In another aspect, at least one embodiment described herein provides a computer program product for allowing a user of a mobile device to select a service from a wireless network for activation and use on a mobile device, the computer program product comprising a computer readable medium embodying program code means executable by a processor of the mobile device for implementing a service activation method as specified above.

It should be understood that various modifications can be made to the embodiments described and illustrated herein, without departing from the embodiments, the general scope of which is defined in the appended claims. It should also be understood that while the embodiments were described for a mobile device, the embodiments are generally applicable to any communication or computing device for which a user can subscribe to a service in a flexible manner.

The invention claimed is:

1. A mobile network service activation system for wireless activation of a selected service on a mobile device, the system comprising:

a central network node configured to:

connect to a plurality of wireless networks in different geographic regions to communicate with the mobile device and access at least one of a server and a gateway providing the selected service, and provide the selected service to the mobile device irrespective of a geographic region in which the mobile device is located; and a registration server configured to provide registration services including: when the mobile device registers successfully, provide the location of the central network node, so that data can be sent between the mobile device and the central network node.

2. The system of claim 1, further comprising a billing server connected to the central network node, the billing server activating the selected service for use by the mobile device in response to a service activation message sent by the mobile device to request access to the selected service.

3. The system of claim 2, wherein the billing server is configured to provide a list of network services to the mobile device, the list of network services for generating a list of available services for display on a display of the mobile device from which the service is selected, the available services comprising network services and device services.

4. The system of claim 3, wherein once the selected service is chosen from the list of available services displayed on the display of the mobile device, a service usage is specified, and confirmation is provided, the mobile device generates the service activation message comprising an indication of the selected service, the specified service usage, and device information for the mobile device; and wherein the service usage specifies a time duration during which the selected service is usable for a plurality of instances.

5. The system of claim 4, wherein after the selected service is chosen and the service usage is specified, the billing server provides a cost estimate and the mobile device provides options for confirming the selected service, declining the selected service and changing the specified service usage.

6. The system of claim 2, wherein the billing server checks and updates billing information prior to activating the selected service.

7. The system of claim 4, wherein the system tracks actual service usage by monitoring data transmissions associated with the mobile device and the selected service and records the actual service usage in the device database, and the system deactivates the selected service when the specified service usage expires.

8. The system of claim 3, wherein the list of available services comprises at least one service selected from the group consisting of: voice mail service, call forwarding service, call display service and call barring service.

9. The system of claim 3, wherein the list of available services comprises at least one service selected from the group consisting of: short messaging service, multimedia message service, instant messaging service and IP modem service.

10. The system of claim 1, wherein the central network node comprises a relay node configured to support message flow between the selected service and the mobile device, wherein the relay node is coupled to at least one other relay node, connected by at least one relay bridge configured to support inter-relay connectivity and form tunnels between different relay nodes.

11. The system of claim 1, wherein the central network node comprises a relay node configured to support message flow between the selected service and the mobile device, wherein the relay node further comprises a wireless transport interface configured to connect the mobile device with a wireless network; wherein the wireless transport interface is configured to communicate with a packet router that routes data packets to and from wireless packet data service networks; and wherein the packet router uses a current IP address of the mobile device for addressing a data packet.

12. The system of claim 1, wherein the central network node comprises a relay node configured to support message flow between the selected service and the mobile device, wherein the system further comprises a provisioning system that is associated with the relay node, wherein the provisioning system is configured to manage at least one of carriers of the wireless networks, subscribers, mobile device manufacturers, and resellers.

13. The system of claim 12, wherein the provisioning system is further configured to assign and manage indicia associated with the mobile device.

14. The system of claim 12, wherein the provisioning system further comprises subscriber validation logic.

15. A mobile device comprising:
a main processor for controlling the operation of the mobile device;
a communication subsystem connected to the main processor, the communication subsystem being adapted for wirelessly sending and receiving data;
an input unit for allowing user selection and confirmation of a selected service;
wherein a central network node is configured to connect to a plurality of wireless networks in different geographic regions to communicate with the mobile device and access at least one of a server and a gateway providing the selected service, and provide the selected service to the mobile device irrespective of a geographic region in which the mobile device is located; and
wherein a registration server is configured to provide registration services including: when the mobile device registers successfully, provide the location of the central network node, so that data can be sent between the mobile device and the central network node.

16. The mobile device of claim 15, further comprising a service request module for providing a list of available services on a display of the mobile device, the list of available services comprising a list of network services and device services, and upon receiving a user selection of the selected service and confirmation of the selected service.

17. The mobile device of claim 16, wherein the service request module is configured to generate a service activation message comprising an indication of the selected service and send the service activation message to a wireless network of the plurality of wireless networks for enabling the selected service.

18. The mobile device of claim 16, wherein the mobile device is configured to receive a list of network services from a billing server, the list of network services for use in generating the list of available services for display on a display of the mobile device from which the selected service is selected.

19. The mobile device of claim 17, wherein the service activation message further includes a specified service usage for the selected service, and wherein a specification of service usage comprises a time duration during which the selected service is usable for a plurality of instances.

20. The mobile device of claim 17, wherein the service activation message further includes device information for the mobile device.

21. The mobile device of claim 15, wherein the input device includes at least one of a keyboard, a thumbwheel, a mouse, a joystick, and a touch screen.

22. A service activation method for receiving a selected service from a wireless network for use on a mobile device, the method comprising:
receiving the selected service from a central network node irrespective of a geographic region in which the mobile device is located, the central network node is configured to connect to a plurality of wireless networks in different geographic regions to communicate with the mobile device and access at least one of a server and a gateway providing the selected service, and providing registration services including: when the mobile device registers successfully, providing the location of the central network node, so that data can be sent between the mobile device and the central network node.

23. The method of claim 22, further comprising:
receiving a list of network services from a billing server, the list of network services for use in generating a list of available services for display on a display of the mobile device, the available services comprising network services and device services, wherein the billing server is connected to the central network node;
generating the list of available services;
providing a list of available services on the display of the mobile device from which the selected service is selected;
generating a service activation message comprising an indication of the selected service and a specified service usage after user confirmation of the selected service is received; and
sending the service activation message to the billing server associated with the wireless network.

24. The method of claim 23, further comprising allowing the service usage to be user-specified, and then providing a cost estimate based on the selected service and the user-specified service usage; wherein the service usage specifies a time duration during which the selected service is usable for a plurality of instances.

25. The method of claim 24, further comprising providing options for confirming the selected service, declining the selected service and changing the user-specified service usage.

26. The method of claim 24, wherein the method further comprises:
checking and updating billing information based on the selected service and the user-specified service usage; and
sending a message to an appropriate network component to activate the selected service for use by the mobile device.

27. The method of claim 26, wherein the method further comprises:
tracking actual service usage of the selected service; and
disabling the selected service when the user-specified service usage expires.

28. A non-transitory computer program product for allowing selection, at a mobile device, of a service from a wireless network for activation and use on the mobile device, the computer program product comprising a computer readable medium embodying program code executable by a processor of the mobile device for implementing a service activation method of a selected service comprising:
receiving the selected service from a central network node irrespective of a geographic region in which the mobile device is located, the central network node is configured to connect to a plurality of wireless networks in different geographic regions to communicate with the mobile device and access at least one of a server and a gateway providing the selected service; and
providing registration services including: when the mobile device registers successfully, providing the location of the central network node, so that data can be sent between the mobile device and the central network node.

* * * * *